April 26, 1960          F. PAGANO          2,933,970
U-SHAPED WASHERS HAVING RETAINING TABS
Filed Oct. 3, 1956
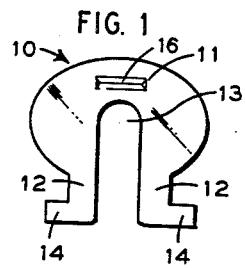
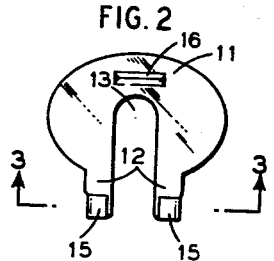
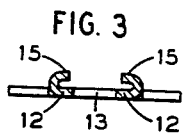
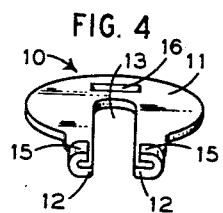
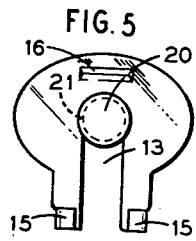
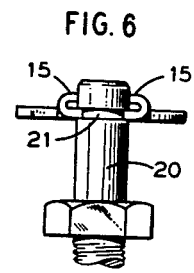
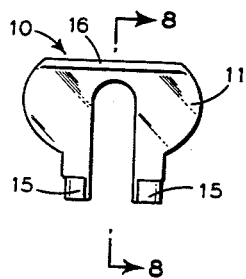
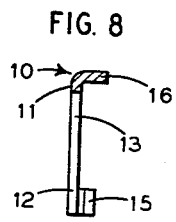
INVENTOR.
Frank Pagano
BY
ATTORNEY United States Patent Office 2,933,970
Patented Apr. 26, 1960

2,933,970

U-SHAPED WASHERS HAVING RETAINING TABS

Frank Pagano, Newark, N.J., assignor to Surelock Mfg. Co., Inc., Brooklyn, N.Y., a corporation of New York Application October 3, 1956, Serial No. 613,741

6 Claims. (Cl. 85—8.8)

This invention relates to washers and, more particularly, to an improved C-washer having a substantially positive locking action on a pin or shaft with which it is assembled.

C-washers are substantially horseshoe shape in plan, having legs which fit in a peripheral groove in a pin or shaft with which the washer is assembled. The washer is usually retained in place by bending the legs toward each other beyond the groove in the pin, bolt, or shaft. However, the locking action offered by such bending is frictional only, and the washer is relatively easily displaced from the shaft.

Washers of this type are frequently used with the anchor pins for the brake shoes of automotive vehicles, the C-washers facilitating assembly and disassembly of the brake shoes relative to the vehicle. In such uses however, it is important that the washer be substantially positively locked in place. For this reason, many relatively intricate designs of C-washers have been suggested and used; however, the cost of such designed washers has been so great, relative to the cost of the common type of C-washer stamped from relative thin metal sheet or strip, that the use of the special forms of washers has been greatly restricted.

In accordance with the present invention, a substantially positive locking C-washer is provided which is inexpensively formed by stamping and bending operations. More specifically, the washer, as stamped from a metal strip or the like, has the usual horseshoe shape but is formed with a pair of tabs projecting laterally outwardly from the outer edges of the legs near the outer ends of the legs. These tabs are then bent at right angles to the plane of the washer and then inwardly parallel to the legs toward the inner-edges of the latter; and the inner edges of the bent tabs may extend to the inner edges of the legs or terminate slightly short thereof.

The washer is preferably provided with a longitudinally extending deformation or bend at its bight to maintain planar rigidity and resistance against twisting during manipulation.

When the washer is assembled with a peripherally grooved element, such as a pin, bolt, or shaft, the outer ends of the legs, having the reentrant tabs thereon, spring apart for the tabs to slide over the full diameter part of the element with the legs snapping into the groove as the reentrant tabs pass beyond the axial plane of the element. The reentrant tabs, by virtue of the space between their inner ends being substantially less than the diameter of the element, block disengaging movement of the washer unless sufficient force is positively applied to spring the legs apart.

For an understanding of the invention principles, reference is made to the following description of typical embodiments thereof as illustrated in the accompanying drawings. In the drawings:

Fig. 1 is a plan view of the C-washer after stamping;

Fig. 2 is a plan view of the completely formed washer;
Fig. 3 is a sectional view on the line 3—3 of Fig. 2;
Fig. 4 is a perspective view of the washer;
Fig. 5 is a plan view of the washer assembled on a peripherally grooved pin or shaft;
Fig. 6 is an elevation view of the pin and washer;
Fig. 7 is a plan view of a modified form of washer; and
Fig. 8 is a sectional view on the line 8—8 of Fig. 7.

Referring to the drawings, the washer 10 is stamped or otherwise cut from a metal sheet or strip to have a generally horseshoeshape including a bight 11 and legs 12 defining a parallel sided slot 13. The outer edges of legs 12, near their outer ends, are formed with outwardly projecting tabs 14. Tabs 14 are then bent upwardly and inwardly, as best seen in Figs. 2, 3 and 4, to provide projections or tabs 15 substantially parallel to and spaced from legs 12.

Projections 15 preferably extend to points just short of the parallel inner edges of legs 12 defining slot 13, although the projections 15 may extend the full distance inwardly to the edges of the slot.

As shown in Figs. 1 to 6, a longitudinal deformation or indentation is formed as at 16 to extend across bight 11, to provide a step or gripping surface; and as shown in Figs. 7 and 8, the outer edge of bight 11 may be bent up, in the form of a hook or flange 16 for facilitating placement and removal of the washer 10; the indentation or flange 16, having additionally the function of rigidizing the washer against twisting deformation during use or when pressure is applied at the bight for application to or removal from its mounting on a pin or bolt, etc.

Washer 10 is designed for mounting on a pin or bolt 20 having a peripheral groove 21 whose inner diameter is substantially equal to the width of slot 13. In mounting the washer on bolt or pin 20, legs 12 are aligned with groove 21. As the washer is pressed onto the member 20, legs 12 are spread apart to allow tabs or projections 15 to ride over the body of the bolt or pin, with legs 12 riding at least partly in groove 21.

As tabs 15 clear the body of element 20, the legs 12 spring back to their parallel relation. A pair of pliers may be applied to the outer ends of legs 12 to compress and angularly displace the legs toward each other to provide a frictional locking of washer 10 on the element. The tabs 15 facilitate operation of the pliers on the washer by providing extended engaging surfaces.

However, an additional, and substantially positive, locking action is provided by the tabs 15 whose inner ends are spaced apart a distance less than the diameter of the body of element 20. Thus, the inner ends of tabs 15 engage element 20 to prevent disengaging movement of washer 10 unless a positive force is applied to spread legs 12.

While specific embodiments of the invention have been shown and described in detail to illustrate the application of the invention principles, it will be understood that the invention may be embodied otherwise without departing from such principles.

What is claimed is:

1. A washer of the type adapted, when seated in a circumferential groove of a pin or bolt, to form an abutment or shoulder thereon, said washer comprising a substantially flat horseshoe shape member having a bight and of a thickness of the order of the width of the groove; substantially flat legs extending from said bight and having substantially parallel inner edges defining a slot having a width of the order of the inner diameter of the groove arranged to receive the peripherally grooved portions of the pin or bolt; and elongated tabs substantially parallel to said inner slot-defining edges of said leg and extending upwardly from the outer edges of the legs adjacent the outer ends of the legs and then inwardly toward the slot; the spacing of the inner ends of said tabs being less than the diameter of the main body of the pin or bolt and being greater than the diameter of the groove; said washer being engageable with the pin or bolt by spreading of its legs to provide for the inner edges of the tabs riding over the body of the pin or bolt with the washer legs riding in the peripheral groove; and said tabs preventing removal of the washer, by engaging the body of the bolt, until a positive removing force is applied to the washer; the upwardly extending portions of the two tabs forming surfaces facilitating application of pliers or the like to the free ends of the legs to compress the latter toward each other.

2. A washer of the type adapted, when seated in a circumferential groove of a pin or bolt, to form an abutment or shoulder thereon, said washer comprising a substantially flat horseshoe shape member having a bight and of a thickness of the order of the width of the groove; substantially flat legs extending from said bight and having substantially parallel inner edges defining a slot having a width of the order of the inner diameter of the groove arranged to receive the peripherally grooved portion of the pin or bolt; and elongated tabs substantially parallel to said inner slot-defining edges of said leg and extending upwardly from the outer edges of the legs adjacent the outer ends of the legs and their inwardly toward the slot parallel to the legs; the spacing of the inner ends of said tabs being less than the diameter of the main body of the pin or bolt; and being greater than the diameter of the groove; said washer being engageable with the pin or bolt by spreading of its legs to provide for the inner edges of the tabs riding over the body of the pin or bolt with the washer legs riding in the peripheral groove; and said tabs preventing removal of the washer, by engaging the body of the bolt, until a positive removing force is applied to the washer; the upwardly extending portions of the two tabs forming surfaces facilitating application of pliers or the like to the free ends of the legs to compress the latter toward each other.

3. A washer as claimed in claim 1 in which said washer is formed from a single blank.

4. A washer as claimed in claim 1, wherein a longitudinal deformation extends along the bight for restraining twisting of the washer during manipulation.

5. A washer as claimed in claim 1 having the outer edge of the bight bent upward to form a manipulating flange.

6. A washer as claimed in claim 5 wherein the bent edge of the bight extends transversely relative to said slot and rigidizes the washer against twisting.

References Cited in the file of this patent

UNITED STATES PATENTS

| | | |
|---|---|---|
| 2,284,222 | Miller | May 26, 1942 |
| 2,392,242 | Goepfrich | Jan. 1, 1946 |
| 2,411,761 | Stolberg | Nov. 26, 1946 |
| 2,755,698 | Wurzel | July 24, 1956 |